R. W. MASKE.
FAUCET.
APPLICATION FILED OCT. 16, 1918.
1,345,615.
Patented July 6, 1920.
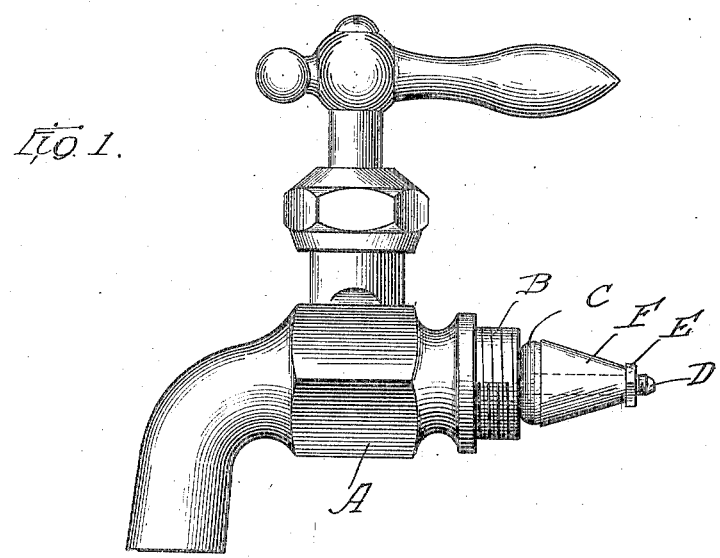
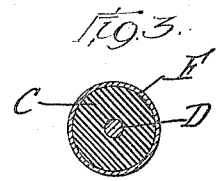
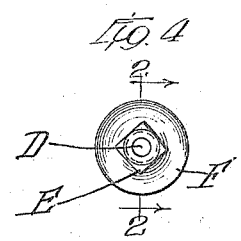
Witnesses:
Harry R. White
W. P. Kilroy
Inventor
Robert W. Maske
By Rudolph _____ Atty.

UNITED STATES PATENT OFFICE.

ROBERT W. MASKE, OF CHICAGO, ILLINOIS.

FAUCET.

1,345,615.  Specification of Letters Patent.  Patented July 6, 1920.

Application filed October 16, 1918. Serial No. 258,331.

*To all whom it may concern:*

Be it known that I, ROBERT W. MASKE, a citizen of the United States, residing at Chicago, in the county of Cook and State of Illinois, have invented certain new and useful Improvements in Faucets; and I do hereby declare the following to be a full, clear, and exact description of the invention, such as will enable others skilled in the art to which it appertains to make and use the same.

This invention has for its object to provide certain new and useful improvements in faucets and more particularly in that type of faucet which is equipped with a rubber valve or so-called "Fuller ball". It has for its object to provide means for protecting the rubber valve from the action of the water and particularly hot water, which causes the same to swell up and disintegrate relatively rapidly thus obstructing the flow of water and causing the faucet to leak.

The invention consists in the features of construction and combinations of parts hereinafter fully described and claimed.

In the accompanying drawings illustrating the preferred embodiment of the invention, Figure 1 is a view in side elevation of a faucet equipped with a valve constructed in accordance with my invention.

Fig. 2 is a fragmentary detail section on the line 2—2 of Fig. 4.

Fig. 3 is a transverse section on the line 3—3 of Fig. 2.

Fig. 4 is an end elevation of the same.

The faucet body A is of the ordinary type known as a "Fuller bib" equipped at its rear end with a threaded flange B bordering the seat for the rubber valve C. The latter is provided with a central bore through which the valve stem D projects and is held against movement on the latter in one direction by means of the nut E. The valve C has a rounded head or seating end and a truncated conical shank portion which ordinarily abuts against the nut E, or a washer bearing thereon.

My invention consists essentially in providing a sleeve F of unyielding material in the shape of a truncated cone, the smaller end of which abuts against the nut E or other shoulder on the stem D. The conical end portion of the valve C is received in said sleeve F and normally projects slightly therefrom so that normally a free space is provided between the smaller end of the valve and the opposed nut E or other shoulder within the sleeve F. Upon effecting closure of the valve the rounded end portion engages the valve-seat and is pressed against the same while the sleeve F crowds up upon the tapered end portion of the valve until the rim of the sleeve closely approaches the valve-seat, thereby obviously protecting the greater portion of the surface of the valve from the water and preventing swelling of the same by absorption thereof.

Upon opening the faucet the sleeve F will first move back to its normal position and thereupon the valve will leave its seat, as will be obvious. The displacement of the rubber due to the pressure thereon will occur in part at the rounded or seat end of the valve and in part in the hollow space in the smaller end of the sleeve.

The invention is adapted to the standard "Fuller balls" without change and may be readily applied by unskilled persons.

It will be noted that the diameters of the end portions of the sleeve are somewhat less than those of the corresponding portions of the valve, so that normally the rounded end portion of the latter projects slightly from the larger end of the sleeve.

I claim as my invention:

1. In a faucet having a valve-seat, a reciprocable valve-stem, a rubber valve through which the latter passes, and a nut on said stem between which and said valve-seat the valve is confined when seated, a hollow truncated cone bearing at its smaller end on said nut and receiving a portion of said valve, there being normally a free space between the valve and the bottom of said cone, the said valve adapted to crowd into said cone to fill or partially fill said space as the valve stem moves to force said valve against its seat, said hollow cone being unyielding in response to pressure exerted thereon when said valve is forced to its seat.

2. In a faucet having a valve-seat, a reciprocable valve-stem, a rubber valve through which the latter passes, and a nut on said stem between which and said valve-seat the valve is confined when seated, said valve having a tapered body portion terminating contiguous to said nut, a hollow truncated cone bearing at its smaller end against said nut and projecting over and engaging said tapered body of said valve and adapted to crowd upon the latter when the same is forced to its seat, there being normally a free space in the smaller end of said cone, the latter being unyielding in response to pressure exerted thereon when said valve is forced to its seat.

3. In a faucet, a valve of yielding material having the end portion thereof opposite the seat end portion thereof in the form of a truncated cone, a protective jacket for said valve, comprising a hollow truncated cone having its larger and smaller ends of slightly less diameter than the larger and smaller ends respectively of the similarly shaped end portions of the valve and adapted to receive the latter, a valve-stem engaged with the smaller end portion of said cone for forcing said valve to its seat, said jacket non-yielding in response to pressure on the exposed end of said valve as the latter is forced to its seat, substantially as and for the purpose specified.

In testimony whereof I have signed my name.

ROBERT W. MASKE.